United States Patent Office 3,846,080
Patented Nov. 5, 1974

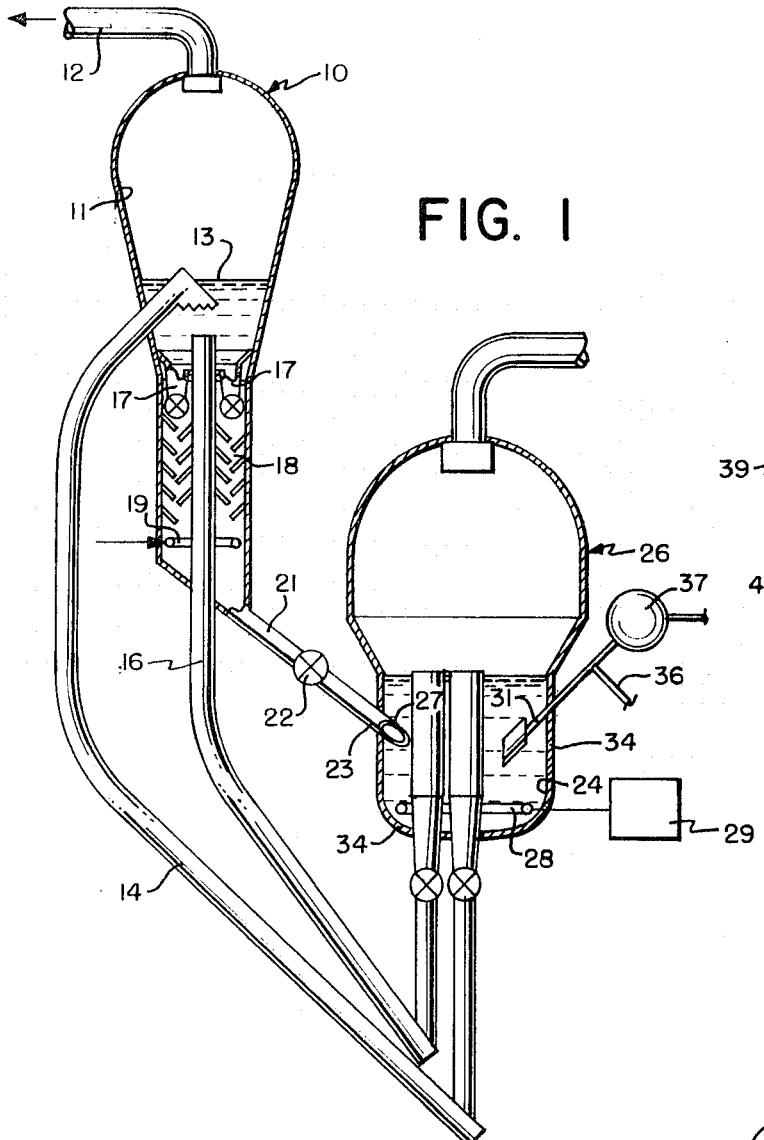
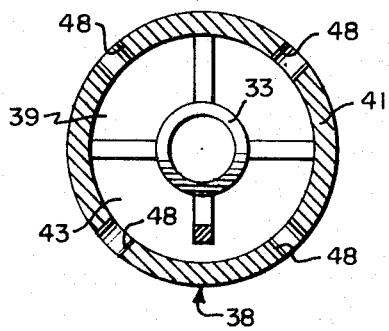
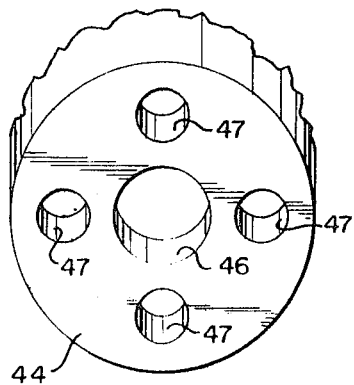
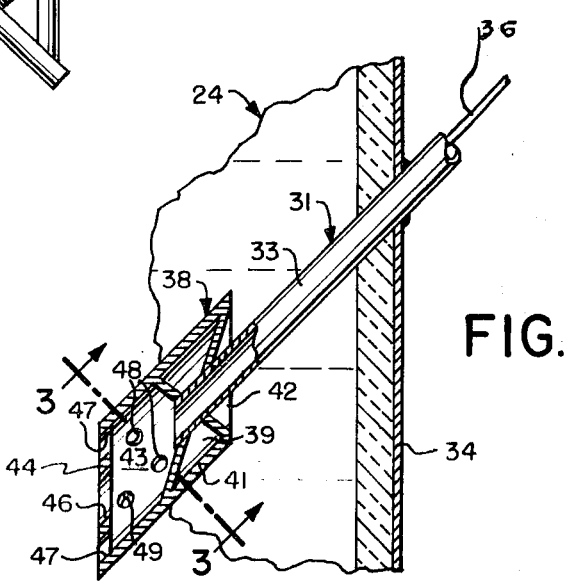

3,846,080
SHIELDED TIP ACCESS TUBE FOR A REACTOR PROBE
John P. MacLean and Henry B. Jones, Houston, Tex., assignors to Texaco Inc., New York, N.Y.
Filed Jan. 26, 1972, Ser. No. 220,753
Int. Cl. B01j 9/20, 11/04; G01k 1/08
U.S. Cl. 23—288 S                    3 Claims

ABSTRACT OF THE DISCLOSURE

The invention relates to an improvement in a fluidized solids reactor, regenerator or other vessel, which allows a more efficient observation of fluid flow and conditions through a fluidized bed and consequently promotes a more uniform process. The apparatus comprises a shielded sensing device or tube which intrudes into the fluidized bed to monitor conditions therein and through which a purge gas is continuously introduced. The tube exposed end is provided with a shielding element which at least partially encloses and forms a protecting chamber about said tube end, yet exposes the latter to conditions existing within the chamber.

BACKGROUND OF THE INVENTION

In the operation of a fluidized catalyst cracking unit, continuous rather turbulent regeneration of a portion of the catalyst material is an essential step. This is due to the gradual formation on the catalyst particles of a carbonaceous deposit or layer in the reaction section of the process. It has been found that the fluid catalyst material can be readily treated or regenerated by passing a continuous stream thereof from the reaction chamber of the cracking unit through a stripping section, and thence into a high temperature regenerator chamber where the said deposit is removed. A continuous stream of regenerated catalyst can then be withdrawn from the regenerator and passed back to the reaction section for use in processing the continuous flow of oil feed.

Both the cracking process as well as the catalyst regeneration step described herein are disclosed in detail in U.S. Pat. 3,394,076, issued on July 23, 1968, to D. P. Bunn et al., and entitled "Method and Apparatus for the Regeneration of Catalyst in the Fluid Catalytic Cracking Process," and in U.S. Pat. 3,433,733 to D. P. Bunn et al., entitled "Method and Apparatus for Fluid Catalytic Cracking." In the disclosure of said patents, the catalyst regeneration step is described as being achieved by the method of circulating a continuous fluidized stream of catalyst through the regeneration chamber. Within the latter, the gas borne catalyst stream is circulated at an elevated temperature. Simultaneously, a stream of combustion supporting gas such as oxygen or air is introduced to the chamber lower end whereby to pass upwardly therethrough to support the burning off of the catalyst deposit.

To assure maximum efficiency in the regeneration of the catalyst, optimum conditions within the regeneration chamber dictate that relatively constant temperature, pressures and catalyst inventory be maintained. To maintain these conditions, factors affecting the temperature, pressure, fluidized bulk density, and catalyst level within said chamber are closely regulated.

Likewise, to assure optimum operation of the reaction and stripping sections, temperature, pressures and catalyst inventories must be held relatively constant. Here also, the factors affecting the temperature, pressure, fluidized bulk density, and catalyst levels are closely regulated.

In monitoring said conditions, the external sensing means introduced to the various fluidized beds often provide false or less than accurate readings. In the instance of pressure taps inserted into the fluidized bed, unsatisfactory measurements by density and level instruments have been experienced. Such poor results are attributable, at least in part, to flow impact and velocity effects where inclined, self-draining pressure probes are used.

To decrease the effect of detrimental conditions within the regeneration chamber on exposed tubular pressure elements, the lower end of the latter, although injected fully into the flow stream of the fluidized mass, is arranged to minimize such distortions in the temperature and pressure conditions. This is achieved in the instant device by the provision of a shielding member disposed about the lower end of the sensing tube or probe to form a partial closure thereabout.

DESCRIPTION OF THE DRAWINGS

FIG. 1 illustrates schematically a fluidized catalyst cracking unit of the type contemplated embodying catalyst regenerator, reactor and stripper members. FIG. 2 is a segmentary cross-sectional view shown on an enlarged scale of a portion of the regenerator chamber of FIG. 1. FIG. 3 is an enlarged cross-sectional view taken along line 3—3 of FIG. 2. FIG. 4 is an enlarged segmentary view along line 4—4 of FIG. 2.

Referring to FIG. 1, the instant fluidized catalyst cracking unit comprises a vessel 10 which houses a reaction chamber 11. The latter is provided with an outflow conduit 12 for conducting gases from the reaction zone. In reaction chamber 11, a desired level 13 of catalyst is maintained within the fluidized bed of catalyst, by the introduction of catalyst particles through a pair of elongated conduits 14 and 16 and controlled withdrawal of catalyst particles through standpipes 17. In said members 14 and 16, regenerated catalyst particles are forced upwardly together with recycled or initially introduced gas oil to promote the process. In the course of the catalyst use, particles of the latter normally become coated with an outer layer of a carbonaceous material such as coke.

Toward the regeneration of the fluidized catalyst within said chamber 11, the latter is provided with one or more standpipes 17 which extend downwardly through the catalyst bed, and into which catalyst particles are received. Said standpipe 17 opens into a stripper section 18 wherein gas entrained catalyst particles are displaced by a stripping medium, such as steam, introduced through a distributor ring 19.

Fluidized particles are then directed through a conduit 21 communicated with stripper 18, by way of a slide valve 22, to be directed into the lower conduit 23 at a controlled rate. The said particles are then introduced into the cylindrically shaped catalyst regenerator chamber 24 within the regenerator unit 26 by way of an inlet port 27. Preferably, the latter opens into said chamber at a tangential relationship to the chamber's vertical side walls.

The catalyst particles are introduced to the regeneration chamber 24 at a relatively high velocity. The particles are thereby swirled about the cylindrical chamber which is maintained at the elevated temperature to achieve the necessary combustion of the coke or other material from the surface of the particles.

Toward promoting the combustion process within regeneration chamber 24, a stream of air is urged into the lower end of said regeneration chamber in a manner to form a uniform, upward stream and establish a constant combustion supporting atmosphere. As shown, said air is introduced from a pressurized source thereof, 29, to a manifold system 28 at the lower end of chamber 24.

To maintain the desired conditions of temperature, pressure, catalyst level, and catalyst density within the swirling mass of particulated catalyst, and as mentioned herein, the environment within the regenerator portion 24 is continuously monitored. This is achieved as shown in FIG. 2 by the intrusion of one or more, and preferably a plurality of probe elements 31 into regenerator chamber 24 in such a manner that pressure and temperature sensing members are disposed at various discrete points within the swirling mass.

As shown specifically in FIG. 2, probe element or member 31 normally comprises an elongated cylindrical tube 33. The latter is fixed usually by welding, to a vessel wall, and enters the vessel preferably at a predetermined angle, to promote self-cleaning, through wall 34 of the regenerator chamber 24.

The lower end of tube 33 as mentioned, is disposed to position the end thereof fully within the fluidized stream of the circulating catalyst mass. It is understood however, that while a single probe element 31 is herein shown, a plurality of such elements are normally disposed apart to afford a more accurate overall measurement.

The exterior end of tube 33 is connected to a pressure sensing device 37 and to a pressurized source of purge gas 36 for passing the latter in a continuous controlled, measured stream. The purge gas normally travels through tube 33 and into the mass of fluidized catalyst. The effect of such purge gas is to prevent catalyst or other particles from plugging the tube 33.

To protect the exposed end of probe element 31, tube 33 is provided with a shield 38, having opposed end faces, said shield 38 being connected to and depending from said tube 33 remote end. The shield or sleeve 38 is spaced outwardly from the tube and defines an annular space 39 therebetween. Said shielding member 38 as shown in FIG. 2, is generally tubular in configuration, having a sufficiently thick wall 41 to provide the desired protection in the high temperature atmosphere. Shield 38 is disposed substantially concentric to and coaxial with tubular member 33, and extends for a sufficient distance beyond the tube remote end to form a partial chamber 43 about the exposed end of tube 33. While a sensing element might be enclosed within tube 33 to sense conditions within the fluidized mass, the invention is aptly illustrated by the embodiment shown. In said embodiment, tube 33 functions as a conduit rather than as an enclosure for such an element. Conduit 33 is communicated with pressure sensing device 37 whereby to transmit conditions within catalyst regenerator chamber 24 to said sensing device 37. The opposed end faces of shield 38 are preferably though not necessarily parallel to the vertical walls of catalyst regeneration chamber 24.

The rear or upper end 42 of shield 38 is preferably maintained in an open condition although communicated with forward chamber 43 which is defined between the shield walls. The latter, as shown in FIGS. 2 and 4, is further provided with a face plate 44 having a central opening 46 extending transversely therethrough, and preferably having a common center line with, and equal in diameter to the opening in the lower end of tube 33. Again referring to FIG. 2, the open lower end of tube 33, as well as that of shield 38, are severed in a generally vertical plane. The disposition of said plate will thus be more compatible with the flow of fluidized catalyst particles and gas within the bed. Face plate 44 is further provided with a plurality of access ports 47 formed outwardly of, and about the central port 46. Ports 47 provide communication with partial chamber 43 whereby to afford access to the end of tube 33. Central opening 46 provides both access to chamber 43 and access way for passage of a cleanout rod therethrough.

As shown in FIGS. 2 and 3, shield 38 is further provided with a plurality of stabilizing openings 48 and 49 which traverse wall 41 of the shield. Said openings permit free communication between the fluidized catalyst mass and partial chamber 43 wherein the end of said tube 33 is disposed.

While the instant invention has been described relating to use in the regenerator chamber 24 and connected to an external pressure sensing element, it is recognized that tube 33 could be fitted as mentioned with internal sensing elements to measure temperature or pressure. The instant invention could likewise be used to equal advantage in any fluidized bed of which herein described reaction and stripping chambers are illustrative.

Other modifications and variations of the invention as hereinbefore set forth may be made without departing from the spirit and scope thereof, and therefore, only such limitations should be imposed as are indicated in the appended claims.

We claim:

1. In a regenerator for a fluidized catalyst wherein the particulated catalyst material is circulated within a regeneration compartment having vertical walls, in a turbulent flow by a carrier gas to form a fluidized bed, and wherein the condition of said fluidized bed is regulated to maintain predetermined operating conditions therein, the improvement for continuously monitoring the pressure within said fluidized bed comprising, a conduit extending into said regenerator compartment and having an open end disposed in said fluidized catalyst bed, the other end of said conduit communicated with a source of a purge gas, a pressure sensing element connected to said conduit, and in communication with said regeneration compartment, a shield disposed about said conduit open end defining a chamber in communication with said fluidized bed whereby to receive the fluidized catalyst as well as purge gas at the conduit open end, said shield including a cylindrical element having a perforated wall spaced from said conduit open end, thereby defining an annulus about the conduit, and a substantially flat perforated face plate at the end of said cylindrical shield element to define a partial closure to the latter adjacent to said conduit open end, said face plate being disposed in a plane substantially parallel to the vertical walls of said regeneration compartment.

2. In an apparatus as defined in Claim 1, wherein said face plate includes a central opening communicating said chamber with said fluidized catalyst bed, and a plurality of openings disposed about said central opening.

3. In an apparatus as defined in Claim 1, wherein said perforated face plate is aligned substantially tangent to the flow of said fluidized catalyst bed through said regeneration compartment.

References Cited

UNITED STATES PATENTS

| | | | |
|---|---|---|---|
| 2,833,844 | 5/1958 | Burton et al. | 73—349 X |
| 3,497,398 | 2/1970 | Ehrenberg et al. | 136—231 X |
| 3,135,700 | 6/1964 | Lipuma et al. | 23—288 S X |
| 1,869,788 | 8/1932 | West | 136—231 X |
| 2,937,988 | 5/1960 | Polack | 23—284 X |
| 2,899,374 | 8/1959 | Gomory | 23—288 S X |
| 2,965,454 | 12/1960 | Harper | 23—288 S |
| 3,246,883 | 4/1966 | Ashbrook | 259—4 X |
| 2,890,929 | 6/1959 | Rummert | 23—284 X |
| 2,528,514 | 11/1950 | Harvey et al. | 23—259.2 X |
| 3,175,888 | 3/1965 | Krejci | 23—259.5 |
| 3,105,778 | 10/1963 | Anderson | 261—79 A X |
| 2,461,172 | 2/1949 | Pelzer | 23—288 S X |
| 2,465,628 | 3/1949 | Border | 23—288 S X |

FOREIGN PATENTS

| | | | |
|---|---|---|---|
| 734,702 | 8/1955 | Great Britain | 73—349 |

JOSEPH SCOVRONEK, Primary Examiner

U.S. Cl. X.R.

23—288B; 73—349; 136—231; 252—417